United States Patent Office 3,808,170
Patented Apr. 30, 1974

3,808,170
PROSTHETIC MATERIAL
Sam Rogers, Room 900, 22 W. Madison St.,
Chicago, Ill. 60602
No Drawing. Filed Oct. 12, 1971, Ser. No. 188,562
Int. Cl. C08f 45/04
U.S. Cl. 260—42.53                    15 Claims

ABSTRACT OF THE DISCLOSURE

A prosthetic dental filling material is visually translucent and yet is opaque to X-rays. The preferred composition is an epoxy resin derived from bisphenol A and a methacrylic acid compound crosslinked with a diester or triester of methacrylic acid as the matrix, and a barium-containing glass filler.

---

This invention relates to prosthetic materials, and more particularly concerns filled plastic dental filling composition which are both translucent and, at the same time, opaque to X-rays.

The time-honored use of silver amalgam and gold dental fillings has, in recent years, partially given way to organic plastics and ceramic-plastic aggregates. These, for the most part, are simple to employ, and permit dental fillings at the front of the mouth. At the same time they avoid the softness and potential mercury toxicity of silver amalgams, and the expense and difficult installation of cast gold fillings.

Unfortunately the plastic and ceramic-plastic fillings now in vogue (1971) are transparent to X-rays. As a result, it is impossible for the dentist to inspect his restoration and, more importantly, to detect decalcified dentin, caries, overhanging margins, defects, and voids when examining X-ray photographs of teeth having previously been restored with non-metallic fillings.

It is, accordingly, a major object of the present invention to provide a prosthetic material suitable for use as a dental filling which combines the optical translucency of plastic and ceramic-plastic fillings while, at the same time, is opaque to X-rays. Another object is to provide such material in a form such that it has long shelf life, can be composited readily by the dentist, can easily be installed, and which remains permanently and inertly in the tooth structure.

A further disadvantage of many plastic and ceramic-plastic aggregates, to say nothing of gold and silver fillings, is that their coefficients of thermal expansion and of thermal conductivity differ significantly from those of the tooth itself. This is commonly experienced as an unpleasantness when the patient eats or drinks a material that is particularly hot or cold. A further object is to provide a dental filling material with coefficients of thermal expansion and of thermal conductivity that closely resemble those of natural teeth.

Additional objects of the invention include the provision of a dental filling material which is: essentially non-toxic or otherwise non-irritating to body parts, and is inert to body fluids; capable of being rendered virtually immune to ultraviolet light discoloration; capable of being pigmented to resemble any tooth tint; can be polished to a gloss resembling that of natural teeth; and contains no ingredients which are so abrasive as to dull dental tool or abrade facing tooth surfaces. Other and more particular objects, aims, and advantages will become apparent as the description of the invention proceeds.

Briefly, in accordance with the invention, there is provided an optically translucent yet X-ray opaque prosthetic material which comprises two ingredients. The first is a synthetic organic resin which forms a matrix that is substantially inert to body fluids, and the second a finely divided glass filler, in which the glass contains a sufficient amount of barium oxide to render the resulting prosthetic material opaque to X-rays. The resin, which is preferably an epoxy resin cross-linked with a methacrylate diether or triester, is usually present in a minor amount, while the predominant component, the glass, encases an X-ray impervious material in a medium which is totally inert to the body.

Virtually any of the synthetic organic resins that are capable of forming hard matrices that are inert to body fluids may be employed for the matrix. It is preferred, however, that the resin be a thermosetting resin which, in the form it is packed into a tooth excavation, is incompletely polymerized, and which is thereafter completely polymerized in situ to form the hard matrix. Desirably, the resin is itself transparent or only slightly translucent, and many such suitable materials are described in Billmeyer, "Textbook of Polymer Science," Interscience, 1964. In the preferred embodiment of the invention, the synthetic organic resin is an incompletely polymerized epoxy resin (see "Epoxy Resins" in Kirk-Othmer, "Encyclopedia of Chemical Technology," Interscience, 2nd edition, volume 8, page 294), which is mixed with a small amount of a methacrylate diester or triester monomer and with the finely divided glass filler, and polymerized in situ in the tooth. Polymerization with a free radical catalyst such as a peroxide or an azo compound, desirably in the presence of a catalyst activator or accelerator added just before use, occurs readily at approximately body temperature, an evolves little or no heat during the polymerization. Cross-linking between the epoxy resin and the methacrylate diester or triester thus produces a thermosetting plastic matrix in which the barium-containing glass is permanently embedded.

As noted above, the preferred organic resins are epoxies, and are optimally derived by condensation, usually in an alkaline environment, of bisphenol A (4-hydroxyphenyl dimethylmethane), or a similar phenolic compound, and an oxirane-containing compound such as glycidyl methacrylate. Alternatively, non-glycidyl methacrylic acid compounds such as methacrylic acid may be used. Where the incompletely polymerized resin is an epoxy derived from bisphenol A and a methacrylic acid compound, it is desirable that at least about two moles of the methacrylate be used per mole of bisphenol A. This provides a viscous liquid, or resinous semi-solid, that is easily worked, and that may be thinned by a small amount of the methacrylate diester or triester monomer, as will be described presently.

To form a thermosetting solid from the incompletely polymerized resin and the cross-linking methacrylate diester or triester monomer, a two-component catalyst capable of functioning at body temperatures is employed. One of these components is a free radical catalyst of the peroxide or azo type, typically 2,4-dichlorobenzoyl peroxide, lauroyl peroxide, benzoyl peroxide, azobisisobutyronitrile, or t-butyl peroxy isobutyrate. These free radical catalysts are essentially inert at body temperatures unless a free radical catalyst accelerator, or activator, is present; these materials are well known, and are typified by DMDA, variously known as N,N-dimethyl 3-5-xylidine, or N,N-dimethyl 3-5-dimethylanaline, etc. While other accelerators are known, some of the more common ones such as dimethyl para toluidine produce a discoloration in the finished product that, for front-tooth filling purposes, is not desirable.

Inasmuch as dental filling materials must pass the American Dental Association test for discoloration under accelerated conditions of ultraviolet light exposure, it is usually desirable to employ an ultraviolet light absorber in the resin composition. Many such commercial products are known, and are typified by "Permasorb" (National Starch) and "UV 9 Ultrasorb" (American Cyanamid).

Where it is desired to tint the filling material to match the color of a patient's teeth, this may conveniently be accomplished by incorporating a pigment in the resin before it is supplied to the dentist. Many suitable pigments are available through commercial sources and are typified by the lake maple blends (Stange Co., Oakland, Calif.).

Where, in accordance with the preferred embodiment of the invention, the synthetic organic resin is derived by condensing bisphenol A and a methacrylic acid compound, it is desirable to effect final polymerization in the presence of a small amount of a cross-linking monomer. These monomers are advantageously methacrylic acid diesters or triesters. The preferred monomer is 1-3-butylene dimethacrylate, although excellent results are obtained with ethylene dimethacrylate (dental grade). Other monomers include neo-pentyl glycol dimethacrylate, 1,6-hexamethylene dimethacrylate, 1,1,1-trimethylol ethane trimethacrylate, and 1,1,1-trimethylol propane trimethacrylate. These monomers are typically employed in the proportion of 1-20 parts by weight of monomer per 100 parts of epoxy resin.

Storage stability of the resin-methacrylate diester or triester monomer mixture is facilitated by including an inhibitor in the mix. Beta hydroxy toluene (BHT), food grade, has proven particularly applicable, although hydroquinone has tended to discolor the final product somewhat. Only about 500–6000 p.p.m. of inhibitor, based on methacrylate monomer, need be employed to inhibit premature polymerization of the resin-monomer mix and avoid discoloring the finished dental restoration.

The X-ray opaque component, normally employed as the major component of the prosthetic material, is a barium glass. By maintaining the barium in a well-fused glass, either amorphous or crystalline, any possible toxic effects of barium are avoided entirely. To this end, a barium glass is advantageously prepared by melting together, in an iron-free environment, barium oxide together with other glass-making components. Desirably, the barium oxide comprises from about 10 to 25 mole percent of the final glass, the remaining ingredients preferably including boron trioxide at about 5 to 15 mole percent, aluminum oxide at about 3 to 8 mole percent, silicon dioxide at about 25 to 75 mole percent, with only incidental impurities. A variety of other glass-making compositions may be employed, provided only that they contain sufficient barium oxide to render the resulting resin-glass material X-ray opaque. In this respect, glass-making compositions are widely described in the literature, e.g., in Stookey U.S. 2,920,971, and need be modified only to contain the requisite amount of barium.

After preparation of the barium glass, the glass is pulverized to the desired degree of fineness. Ordinarily, a glass powder capable of passing a 325 mesh (U.S. standard screen) is sufficient, and avoids the possibility of having large particles of glass which would abrade either dental polishing tools or opposed tooth faces.

The proportion of glass to resin matrix may vary widely. As noted above, it is preferred that the glass component be present in major amount, that is, at least about 50% by weight. However, proportions of glass to total mixture within the range of about 60–80% appear to be optimum.

Before mixing the glass powder with resin-forming components, it is highly desirable that the glass be treated so as to render is hydrophobic. This not only provides a more stable prosthetic structure, but apparently increases the desirable mechanical properties of the resulting aggregate. The preferred treatment for rendering pulverized glass hydrophobic comprises mixing the glass with a solution containing a silane, preferably a vinyl trichlorosilane, or any of the commercial silanes such as gamma-methacyloxy propyl tri-methoxy silane ("A 174," Union Carbide Corp.), or n-b-amino ethyl, y-amino propyl trimethoxy silane (Dow Corning). Silane treatment is conveniently effected merely by mixing the glass in a silane solution in acetone, and thereafter heating the resulting slurry to evaporate the acetone at 120–130° for ½ hour.

It is preferably, in the practice of the invention as applied to the making of a dental filling material, to provide a two component mixture to the dentist and have the dentist mix both components together just before using. For this procedure, two component mixes are prepared, each containing an intimate admixture of incompletely polymerized synthetic organic resin and the finely divided barium glass filler, in the proportions to be used in the final product. One component also contains a free radical catalyst such as a peroxy or an azo compound, well dispersed, while the second component contains the catalyst accelerator. Tints, where required, are added to the second component. The dentist then need only mix equal proportions of the two components together immediately before use, and the conjoint action of the accelerator and catalyst serves to polymerize the resin when the components are mixed together to form the resulting filling.

While the composition of the invention is primarily useful in dental fillings, its inertness to body fluids and its opacity to X-rays permits its use in a variety of other prosthetic applications. For example, it may be used to cement bones together during an operation; by the time the surgical enclosure is to be re-sewn, the material has hardened thoroughly.

For dental uses, a particular advantage of the invention is that the restoration is quite hard within a minute or a minute and a half of filling. In another ten minutes or so it is so hard that it may be ground and polished to a final finish. Thus the dentist, within a short period of time, can provide a restoration that is pleasing in appearance, closely matches the natural tooth, is inert to body fluids, is non-toxic, and is opaque to X-rays.

EXAMPLE

This example illustrates the preparation and use of a prosthetic dental filling material according to the invention.

An epoxy resin, incompletely polymerized, is prepared by condensing two moles of glycidyl methacrylate with one mole of bisphenol A, usually under alkaline conditions. Materials of this type, in which the ratio of methacrylate to bisphenol A is two or more, are obtainable commercially from the Freeman Chemical Company, Port Washington, Wis., under the trademark "Stypol 46–4005."

The glass filter is prepared by melting, in a platinum crucible positioned in an electric furnace, and mixing the following components in the stated oxide mole percentages: silca 66%, barium oxide 17%, $B_2O_3$ 11%, and alumina 6%. Iron-free components are highly desirable. During the melt, the material is stirred with a platinum-rhodium (90:10) stirrer coupled to an electric motor drive. The fusing temperature is approximately 1650° C.

After cooling, the glass melt is ground to pass 325 mesh screen (U.S. standard).

Treatment of the finely divided glass to render it hydrophobic is effected by dissolving 0.5 gram of vinyl trichlorosilane in 90 grams acetone, and stirring in 100 grams of pulverized glass. The resulting mixture is heated at 120° C. to dryness.

Two separate paste components are prepared, one containing the benzoyl peroxide catalyst and the other the DMDA catalyst accelerator. Preparation is effected as follows:

The first paste component is prepared by dissolving 300 mg. benzoyl peroxide in 2 grams ethylene dimethacrylate with rapid stirring, using a glass rod. The ethylene dimethylacrylate contains 6000 p.p.m. of beta-hydroxy toluene as an oxidation inhibitor. When the peroxide is completely dissolved, 550 mg. of ultraviolet light absorber ("UV 9 Ultrasorb," American Cyanamid, or "Permasorb," National Starch; both apparently 2-hydroxy-4-2-hydroxy-3-methacyloxy compounds), and continuing stirring until completely dissolved.

Then, 40 grams of the bisphenol A-glycidyl methacrylate resin is separately warmed so that it flows; the ethylene dimethacrylate solution is then added. The mixture is stirred until all materials are thoroughly mixed. Finally, 120 grams of the silane-treated glass is slowly added with rapid stirring, 5 grams at a time, until the entire mixture is homogenously mixed.

The second paste component is prepared similarly. Two grams ethylene dimethacrylate (containing 6000 p.p.m. BHT) is admixed with 550 grams ultraviolet absorber, with stirring. Then the di-methyl-di-methyl aniline (DMDA), 90 mg., is added, and the mixture again stirred thoroughly. Forty grams of resin is warmed until it flows easily, and to this resin is added the ethylene dimethacrylate solution, with stirring until completely homogenous. The 120 grams silane-treated glass is added, 5 grams at a time, while stirring vigorously until a well mixed paste is formed. Should it be desirable to color the filler material to match tooth shades, a pigment such as one of the lake maple blends (Stange Co., Oakland, Calif.) may be added to the second paste, i.e., the one containing the DMDA accelerator.

To prepare the prosthetic tooth filling material, equal parts of the first and second paste components are mixed together with a stainless steel, wood, plastic, or agate spatula for 30 seconds until the mixture is homogeneous. The filling material is then inserted in the tooth, and hardens in from a minute to a minute and a half. Polishing of the restoration in a patient's mouth can begin within an additional five or ten minutes.

X-ray photographs of teeth filled with the composition of the invention show an image similar to that of teeth filled with conventional gold or silver fillings. Experimental tests of several months duration indicate no damage to the tooth nerves, no discoloration, and no erosion of facing tooth surfaces.

Thus it is apparent that there has been provided, in accordance with the invention, an outstandingly effective prosthetic material. It may be stored for long periods of time, readily inserted into the tooth excavation, and performs as satisfactorily as conventional filling materials. More importantly, it combines the ease of handling and optical translucency of plastic restorations with the X-ray opacity of gold or silver fillings.

While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

I claim as my invention:

1. A direct dental filling material formed by polymerizing, in situ, a thermosetting organic resin containing a finely divided X-ray opaque glass filler, said polymerizing being initiated by mixing together substantially equal volumes of two paste-like components, each component comprising:
(a) the reaction product of bisphenol-A and a methacrylic acid compound and
(b) a finely divided glass filler composition which includes 10 to 25 mole percent of barium oxide, said glass composition making up substantially 60 to 80% by weight of each component;
one of said components including a free radical catalyst capable of functioning at body temperatures; and
the other of said components including a catalyst accelerator.

2. A material as set forth in claim 1 wherein said finely divided glass filler is capable of passing a 325 mesh, U.S. standard screen, the composition of said glass filler including 5 to 15 mole percent boron trioxide, about 3 to 8 mole percent alumina and about 25 to 75 mole percent silica.

3. A dental filling material as set forth in claim 1 wherein at least one of said two components contains an ultraviolet light absorber.

4. A dental filling material as set forth in claim 1 wherein said component including a free radical catalyst also includes a pigment.

5. A dental filling material as set forth in claim 1 wherein said resin is polymerized in the presence of a methacrylic diester or triester monomer.

6. Material of claim 1 wherein said methacrylic acid compound is glycidyl methacrylate.

7. Material of claim 1 wherein said methacrylic acid compound is methacrylic acid.

8. Material of claim 1 wherein said filler is rendered hydrophobic by treatment with a silane.

9. Material of claim 1 wherein said catalyst comprises a peroxy catalyst.

10. Material of claim 1 wherein said catalyst comprises an azo catalyst.

11. Material of claim 1 wherein said catalyst accelerator is N,N-dimethyl-3-5-xylidine.

12. Material of claim 5 wherein said monomer is ethylene dimethacrylate.

13. Material of claim 5 wherein said monomer is 1-3-butylene dimethacrylate.

14. In a dental restorative composition which upon hardening is translucent, yet X-ray opaque, said composition including a polymerizable thermosetting organic resin binder and an inorganic filler wherein said inorganic filler makes up substantially 50 to 80% by weight of said restorative composition and comprises a finely divided glass composition which includes 10 to 25 mole percent of barium oxide.

15. A dental restorative composition which upon hardening is translucent yet X-ray opaque, said composition including a polymerizable thermosetting organic resin binder and an inorganic filler, said binder being derived from bisphenol A and a methacrylic acid compound and said filler making up substantialy 50 to 80% by weight of said restorative composition and comprising a finely divided glass composition which includes 10 to 25 mole percent of barium oxide for rendering said dental restorative composition opaque to X-rays, 5 to 15 mole percent boron trioxide, 3 to 8 mole percent alumina and 25 to 75 mole percent silica.

References Cited

UNITED STATES PATENTS

| | | | |
|---|---|---|---|
| 3,066,112 | 11/1962 | Bowen | 260—37 EP X |
| 3,266,147 | 8/1966 | Goldman | 106—35 X |
| 3,452,437 | 7/1969 | Chang | 32—15 |
| 3,539,533 | 11/1970 | Lee et al. | 32—15 X |

LEWIS T. JACOBS, Primary Examiner

U.S. Cl. X.R.

260—37 EP, 998.11, 42.54; 252—478